United States Patent [19]
Parikh

[11] Patent Number: 5,442,740
[45] Date of Patent: Aug. 15, 1995

[54] METHOD AND APPARATUS FOR VISUAL DISPLAY OF PROGRAM PERFORMANCE TRACE DATA

[75] Inventor: Shrikant N. Parikh, Mesquite, Tex.

[73] Assignee: International Business Machines Corporation, Armonk, N.Y.

[21] Appl. No.: 91,788

[22] Filed: Jul. 13, 1993

[51] Int. Cl.⁶ .......................................... G06T 11/00
[52] U.S. Cl. ................................. 395/140; 395/155; 395/159
[58] Field of Search ................. 395/76, 133, 140, 147, 395/155–161, 500; 371/23

[56] References Cited

U.S. PATENT DOCUMENTS

| | | | |
|---|---|---|---|
| 5,121,501 | 6/1992 | Baumgartner et al. | 364/DIG. 1 X |
| 5,140,671 | 8/1992 | Hayes et al. | 395/76 |
| 5,146,460 | 9/1992 | Ackerman et al. | 371/23 |
| 5,168,554 | 12/1992 | Luke | 395/161 |
| 5,247,651 | 9/1993 | Clarisse | 395/500 |
| 5,261,037 | 11/1993 | Tse et al. | 395/76 |
| 5,267,145 | 11/1993 | Zifferer et al. | 395/155 X |

OTHER PUBLICATIONS

Computergram International, Programart Puts MVS Performance Tool Under OS/2, Sep., 1992.

*Primary Examiner*—Almis R. Jankus
*Attorney, Agent, or Firm*—A. Bruce Clay

[57] ABSTRACT

A visual trace of the dominant computer activities conducted during execution of a computer program is displayed for review by an analyst. A time line scale is predefined by the analyst to relate the trace to actual execution time. The trace is displayed as a line with various optional formats for visually distinguishing the dominant computer activity, for example, various line styles, different colors, and/or icons. If an area of the trace appears to need further review, the analyst can select, by any appropriate method, a point on the trace. The trace is linked to the actual code and details of the program so that such a selection will display the program details/code for greater review.

8 Claims, 4 Drawing Sheets

METHOD AND APPARATUS FOR VISUAL DISPLAY OF PROGRAM PERFORMANCE TRACE DATA

TECHNICAL FIELD OF THE INVENTION

This invention relates in general to computer software, and in particular to a method and apparatus for visually displaying trace information to assist a performance analyst in understanding low-level execution details of a program.

BACKGROUND OF THE INVENTION

When a computer program has been developed, it may be necessary to analyze the execution details. Such an analysis is necessary to improve the performance of the many operations going on within the program. For example, if an operation takes too much time, a user of the program is apt to think it is inefficient and therefore not worth purchase. However, if all necessary operations proceed as quickly as possible, a user of the system is more likely to find value and therefore want to purchase the program.

Thus, a performance analyst must determine what occurs underneath the program. To do so, the performance analyst can run an execution trace which will provide feedback as to what occurs during execution. Performance trace tools currently exist which typically display for analyst review a verbal report of the operations that have occurred. The analyst must then read each line of the report and attempt to visualize a composite of what occurs throughout the program. Such a trace may be simplistic in what it can detect and yet turn out great volumes of information that the analyst may be hard-pressed to analyze. Thus, there is a need for a method and apparatus which will allow a performance analyst to visually display program performance trace data for accurate analysis thereof.

SUMMARY OF THE INVENTION

The present invention provides a method and apparatus for the visual display of program performance trace data which substantially reduces or eliminates the burdensome review process of the prior art. The present invention presents a visual summary of the program for improved comprehension of the underlying computer activities.

In accordance with one aspect of the present invention, a method is provided for displaying computer trace data. Predefined computer activities are automatically associated with execution of a computer program. A graphical display is created on a time line depicting said computer activities. Links are automatically established between the graphical display and the program source in order to allow in depth review of the program.

It is a technical advantage of the present invention in that a visual display of trace data is provided. It is a further technical advantage in that an analyst can quickly see the computer activities conducted during execution of a program and can then conduct in depth analysis of the program at selected points.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
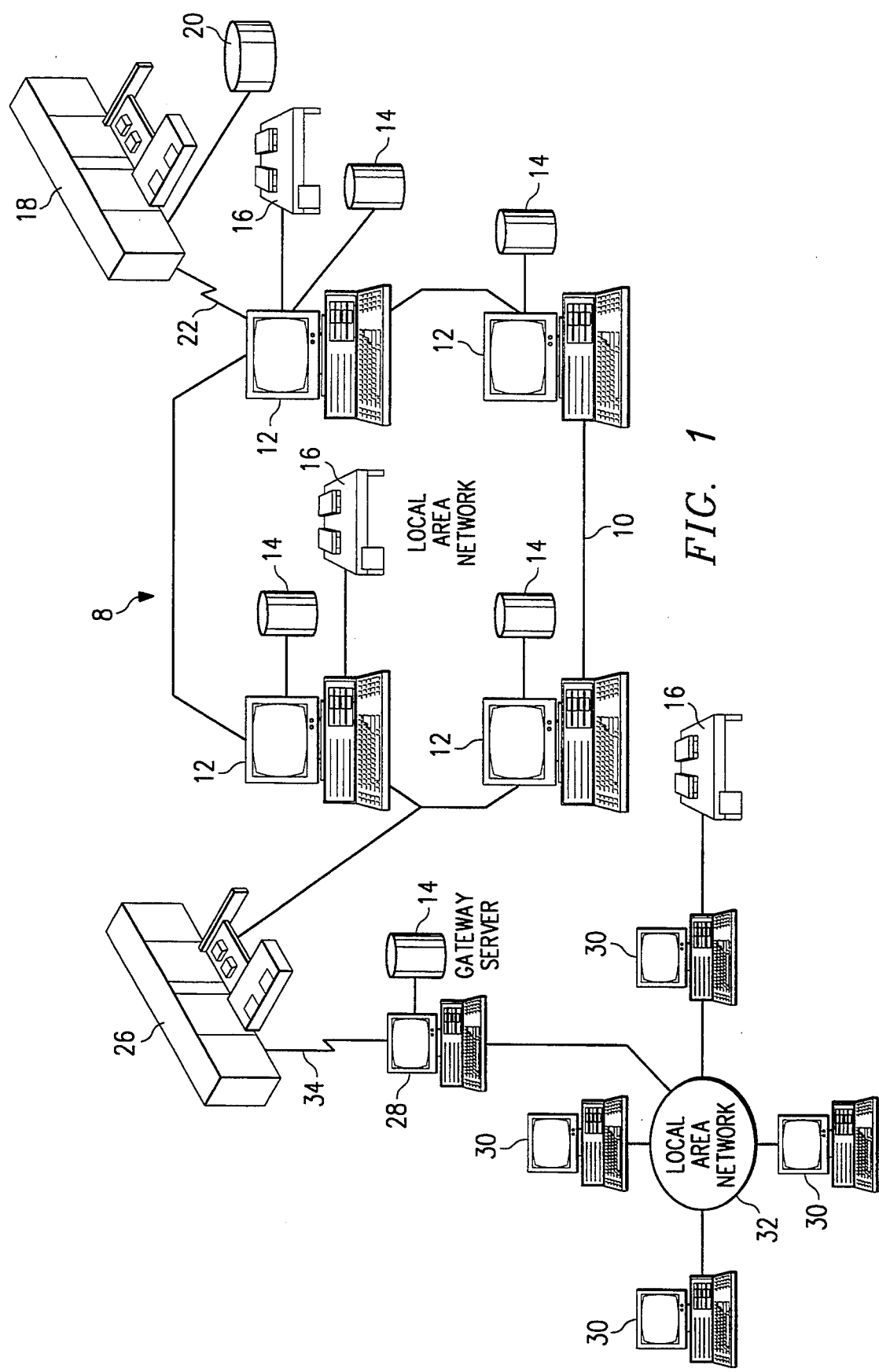
FIG. 1 is a schematic illustration of a data processing system which may be used in accordance with the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications links 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Performance analysts review the actual performance of computer programs to search for areas therein which may be made more efficient. To analyze a program, an analyst will typically utilize a program performance tool which will produce a verbal listing of the operations conducted by the program. Such a listing is fairly simplistic in what is reported to the analyst but, for a complex program, can result in thousands of lines of information on hundreds of pages. The analyst must then review each line of the report and attempt to find areas requiring greater efficiency. Such a report in a generic format may appear as:

| | |
|---|---|
| T₁ Enter Trace Point 1 | Delta = ___ |
| Programmer notes may then appear here | ___ |
| T₂ ___ | |
| T₃ I0 to f₁ | Delta = ___ |
| T₄ Memory Allocated | Delta = ___ |

This report indicates that at time $T_1$ the program entered trace point 1 for the activity contained therein. The program stayed in trace point 1 for a period of time indicated by the symbol delta. Any programmer notes that may have been inserted into the source code would appear along with this information. Additional trace points are subsequently listed along with the information pertinent thereto. As previously indicated, this information is simplistic yet when there are thousands of such entries, the job of an analyst becomes extremely cumbersome.

Figure 2:
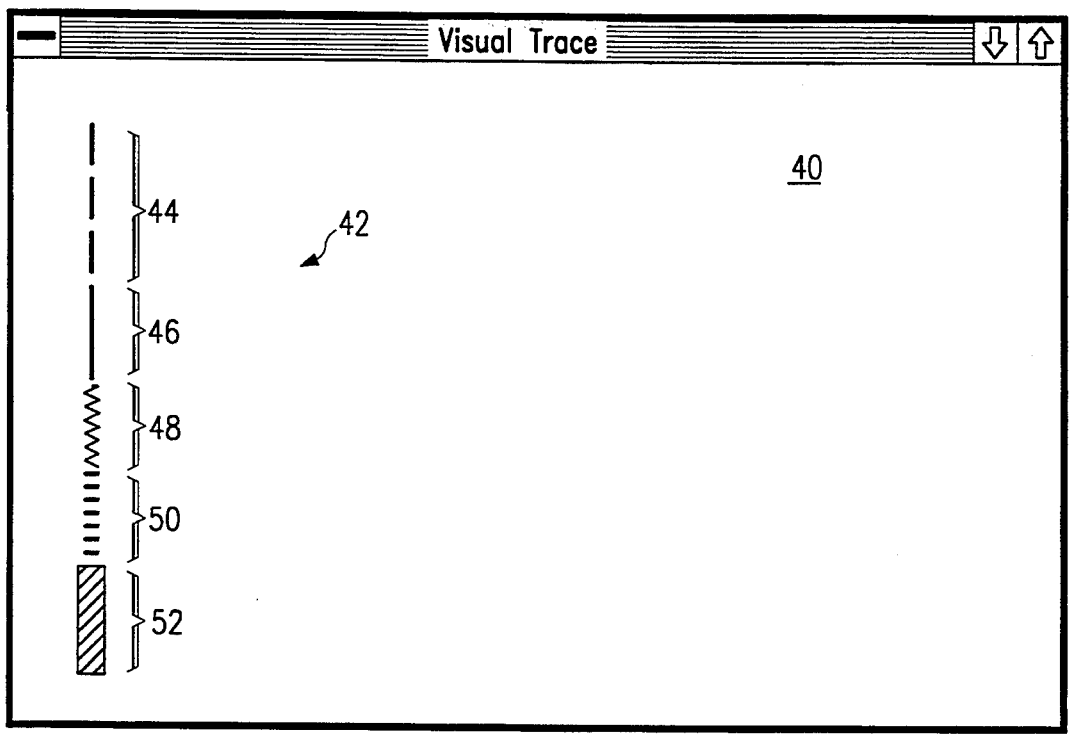
FIG. 2 is one embodiment of a trace in accordance with the present invention.

Referring to FIG. 2, an illustration of one embodiment of the present invention is shown. Within a window 40 on a computer screen, a visual trace 42 is shown. The visual trace 42 comprises a graphical representation of the activities conducted by a computer program. In the visual trace 42, various line styles are used to indicate the dominating activity conducted during the indicated time period. An analyst/user will preselect a time frame scale, such as for example, one centimeter of screen distance equals one hundred milliseconds of execution time. Thus, the length of the visual trace 42 indicates the corresponding execution time of the underlying program. In the visual trace 42 of FIG. 2, a dashed line, generally indicated by the reference numeral 44, is used to indicate a dominating activity of swapping files (i.e., paging in and out of information). A solid line, generally indicated by the reference numeral 46, is used to symbolize the dominating activity of video; a jagged line, generally indicated by the reference numeral 48, is used to symbolize the dominating activity of remote storage I/O; a horizontal dashed line, generally indicated by the reference numeral 50, is used to indicate main memory activity; and a hashed marked line, generally indicated by the reference numeral 52, indicates a CPU intensive activity. It is to be understood that the above listed activities are examples of what may be a greater list of many other activities.

Figure 3:
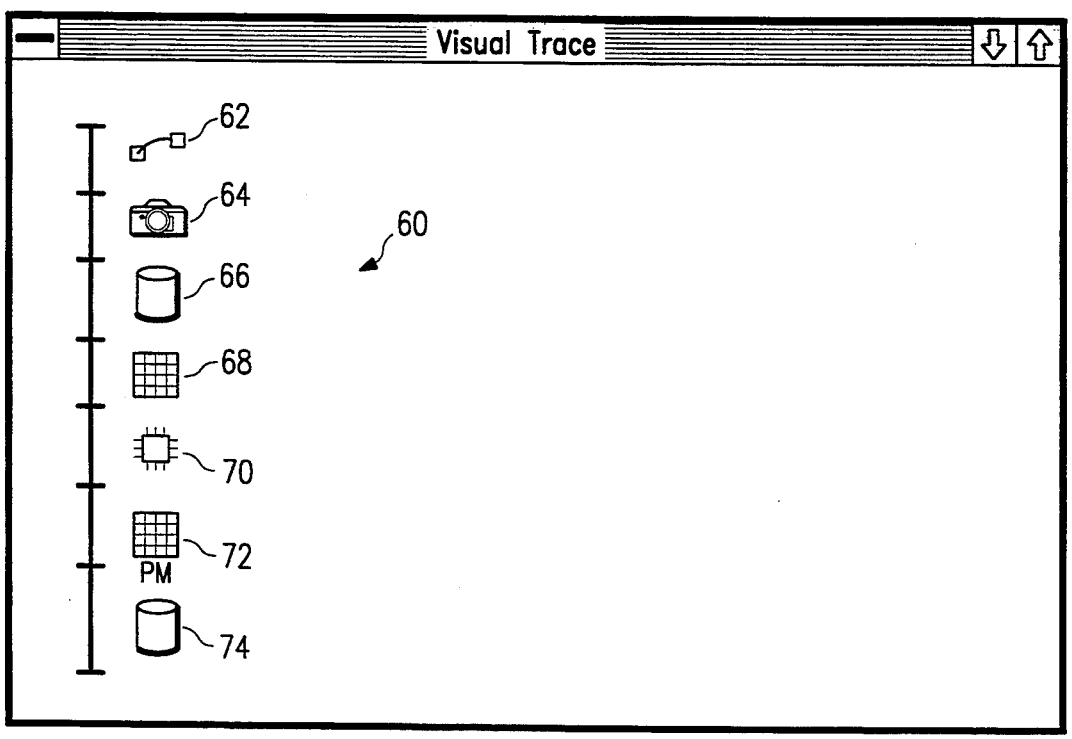
FIG. 3 is another embodiment of a trace in accordance with the present invention.

Referring to FIG. 3, an alternative embodiment to the visual trace 42 of FIG. 2 is illustrated. In FIG. 3, a visual trace 60 is shown as a vertical line separated by horizontal sectioning. Each section of the vertical trace 60 is associated with a graphical object to indicate the dominating activity as opposed to the various line styles of FIG. 2. For example, a swap icon 62 indicates a paging in and out activity; a camera icon 64 indicates a video dominating activity; a storage icon 66 indicates a dominating disk input/output activity; a main memory icon 68 indicates a dominating main memory activity; a chip icon 70 indicates a dominating CPU activity; a PM icon 72 indicates a presentation management activity; and a storage icon 74 indicates a subsequent disc I/O operation to that as shown with the storage icon 66. Although not shown, it is to be understood that variations to the visual traces 42 and 60 are encompassed by the present invention. For example, rather than various line styles or icons, a visual trace could be illustrated through the use of different colors to indicate different program activities. Additionally, the visual trace could be horizontal, diagonal, etc. rather than vertically oriented. It is also to be understood that the present invention encompasses a plurality of visual traces positioned side by side or on separate pages to encompass an entire computer program. Likewise, a plurality of visual traces may be simultaneously illustrated to visually depict the predominate activities of each thread in a program. Also, there may be gaps in the trace indicating no activity during a particular period of time.

Figure 4:
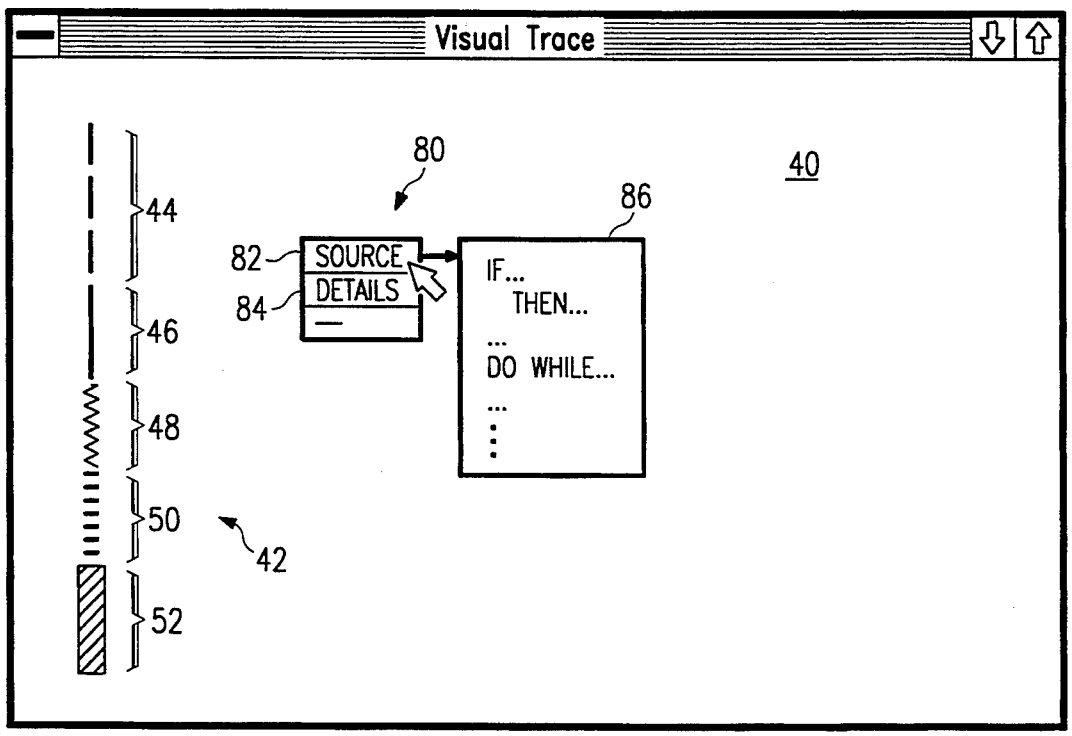
FIG. 4 illustrates information available by selection of a portion of the trace of FIG. 2 or 3.

Referring to FIG. 4, an illustration of linkage between the visual trace 42 or 60 and the underlying program is illustrated. By selecting a point on the visual trace 42 or an icon adjacent the visual trace 60, a pop-up menu 80 will appear. An analyst/operator may then select either source 82 or details 84 for further information. If the analyst selects source 82, a pop-up 86 appears. Within the pop-up 86, the analyst will be presented with the source code of the program associated with the point selected on the visual trace 42 or 60. Thus, the analyst will be able to get greater details on what occurs in the computer program at this point in time.

Figure 5:
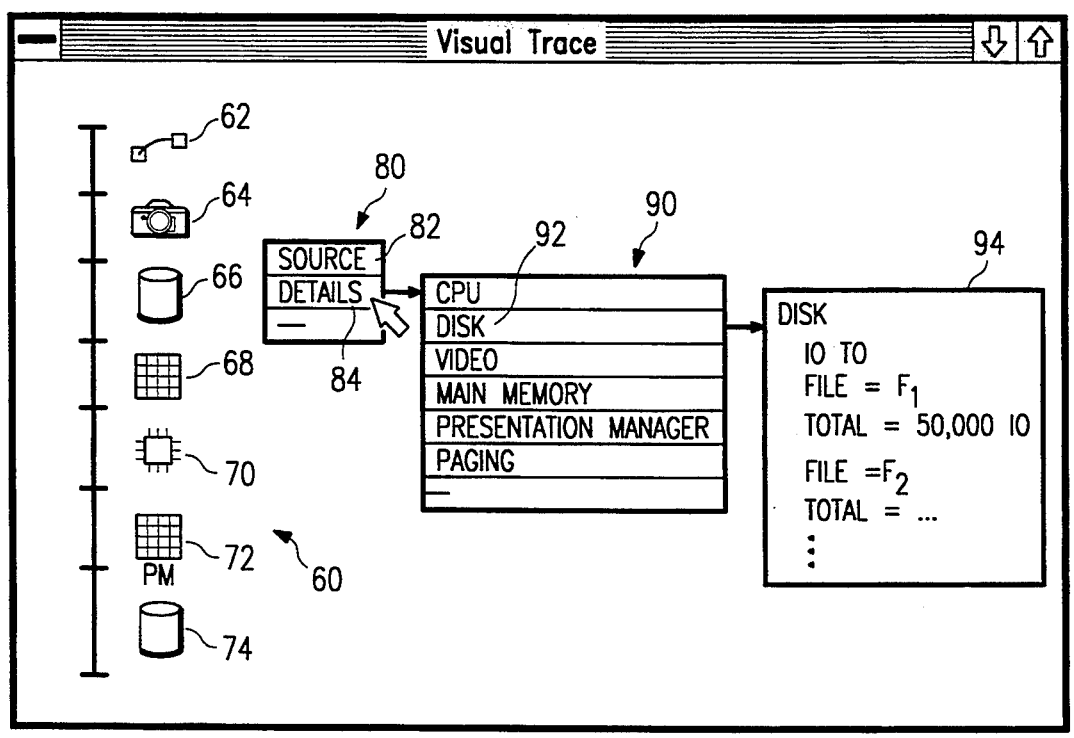
FIG. 5 illustrates further information available by selection of a portion of the trace of FIG. 2 or 3.

Referring to FIG. 5, the analyst selects details 84 from the pop-up menu 80. Upon selecting details 84, a pop-up menu 90 appears. Within the pop-up menu 90, there is a listing of all the activities which occur in the computer program as symbolized by the predominate activity selected by the analyst. The analyst may then select one of the activities listed in the pop-up menu 90 for details pertinent thereto. For example, if the analyst selects disk 92, a pop-up window 94 appears which then details the disk activity occurring at this point in the computer program. Thus, the analyst is provided with a powerful tool which assists in visualization of the activities being conducted by a computer program. Additionally, the analyst is provided with the specific details and/or source code links necessary to further analyze the selected activity.

In addition, an analyst may magnify an area of interest. This can be done by changing the preselected scale which relates screen length of the trace to execution time. Once magnified, an analyst would be able to select any portion of the trace to check the source or details, as previously described above.

It is necessary to provide a coordination table for a programmer to utilize during selection of trace points. The coordination table will provide the present invention with the appropriate codes for symbolizing the major activity in the program. The table listed below is but one example of such a coordination table:

| Trace Point Number | Type of Activity |
|---|---|
| $T_1$ | CPU |
| $T_2$ | Disk I/O |
| $T_3$ | Main Memory |
| . | . |
| . . | . |

It is understood that the coordination table may be changed for a trace to meet any special and/or momentary analysis needs.

Figure 6:
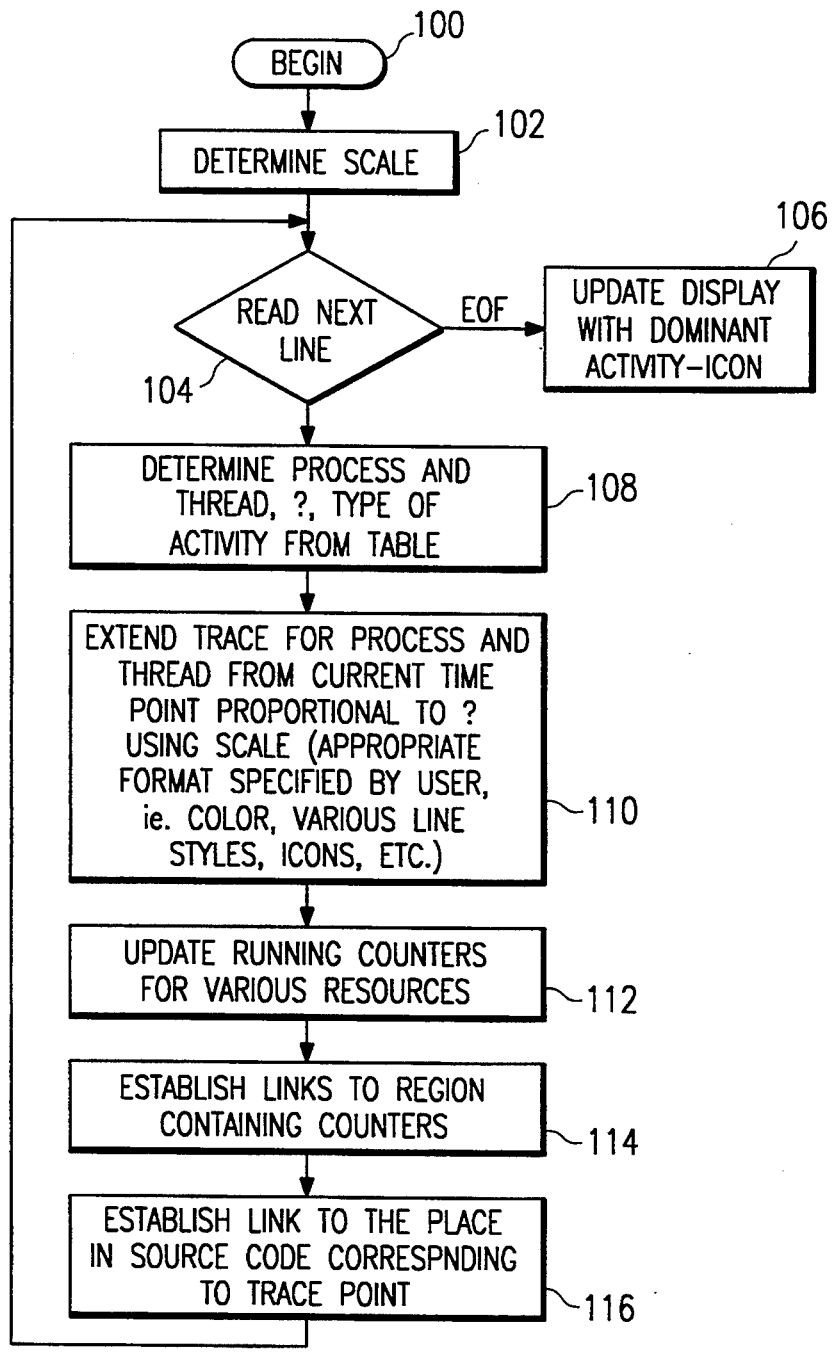
FIG. 6 is a flowchart embodying the present invention.

Referring next to FIG. 6, a flowchart illustrating the present invention is shown. The present invention begins at 100 followed by determination of the time scale at block 102. The analyst/user may indicate the appropriate time scale for use with the present invention, for example, one centimeter equals 100 milliseconds of execution time. It is then determined at decision block 104 whether or not the next line of the program code is to be read. If it is determined that the end of file has been reached, the visual trace display is updated with the dominant activity as appropriate at block 106. If the analyst has elected to display activities with icons, the display is so updated. If there is another line of code to be read, the present invention determines at block 108 the particular process and thread, delta (amount of time elapsed within this trace point), and the type of activity to be symbolized from a coordination table, as previously described.

The visual trace is then extended for the process and thread from the previous point thereon proportional to delta using the scale determined in block 102. Within block 110 it is also indicated by use of the appropriate format as determined by the analyst/user how the visual trace is to appear, i.e., colors, various line styles, icons, etc. Running counters are updated at block 112 for the various resources. Links are then established to the region containing the running counters at block 114. Links are then established to the appropriate place in the source code of the program corresponding to the trace points in the visual trace at block 116. The present invention then returns to decision block 104 to determine if another line of code is to be read.

Thus by utilizing the present invention, a user is able to quickly zero in on problem areas such as, for example, too much activity of a certain type or activity different from what was expected. The present invention presents in composite form an entire computer program for visualization thereof. It may be possible to shorten the analysis cycle time by utilizing the present invention.

Although the present invention has been particularly shown and described with reference to a preferred embodiment, it will be understood by those skilled in the art that various changes in form and detail may be made without departing from the spirit and the scope of the invention.

I claim:

1. A method of displaying on a computer monitor of a computer system performance trace data for a computer program in order to allow analysis of the computer program, comprising the steps of:

associating a plurality of trace points with predefined computer activities which result from execution of the computer program;

displaying on a time line a graphical representation of each said computer activities in accordance with execution of the computer program;

automatically linking said graphical representation to source code of the computer program; and upon selection of any point on said graphical representation automatically presenting for analysis source code which was executed by the computer system at a time corresponding to said any point.

2. The method of claim 1, wherein said step of displaying comprises:

displaying said predefined computer activity as an icon.

3. The method of claim 1, wherein said step of displaying comprises:

displaying said predefined computer activity as a line style.

4. The method of claim 1, wherein said step of displaying comprises:

displaying said predefined computer activity as a line color.

5. A computer system for displaying on a computer monitor of a computer system performance trace data for a computer program in order to allow analysis of the computer program, comprising:

means for associating a plurality of trace points with predefined computer activities which result from execution of the computer program;

means for displaying on a time line a graphical representation of each said computer activities in accordance with execution of the computer program;

means for automatically linking said graphical representation to source code of the computer program; and upon selection of any point on said graphical representation, means for automatically presenting for analysis source code which was executed by the computer system at a time corresponding to said any point.

6. The computer system of claim 5, wherein said means for displaying comprises:

means for displaying said predefined computer activity as an icon.

7. The computer system of claim 5, wherein said means for displaying comprises:

means for displaying said predefined computer activity as a line style.

8. The computer system of claim 5, wherein said means for displaying comprises:

means for displaying said predefined computer activities as a line color.

* * * * *